(12) United States Patent
Essery

(10) Patent No.: US 11,009,833 B2
(45) Date of Patent: May 18, 2021

(54) ELECTRONIC DEVICE WITH SIMULATED ANALOG INDICATOR INTERACTION WITH DIGITAL INFORMATION/IMAGES

(71) Applicant: Timex Group USA, Inc., Middlebury, CT (US)

(72) Inventor: Thomas Essery, Rockfall, CT (US)

(73) Assignee: Timex Group USA, Inc., Middlebury, CT (US)

( * ) Notice: Subject to any disclaimer, the term of this patent is extended or adjusted under 35 U.S.C. 154(b) by 283 days.

(21) Appl. No.: 15/899,595

(22) Filed: Feb. 20, 2018

(65) Prior Publication Data

US 2019/0258208 A1 Aug. 22, 2019

(51) Int. Cl.
| | | |
|---|---|---|
| *G04B 45/00* | (2006.01) | |
| *G04B 19/04* | (2006.01) | |
| *G06T 13/80* | (2011.01) | |
| *G06T 11/60* | (2006.01) | |
| *G06T 3/20* | (2006.01) | |
| *G06T 3/40* | (2006.01) | |

(52) U.S. Cl.
CPC ......... *G04B 45/0015* (2013.01); *G04B 19/04* (2013.01); *G06T 11/60* (2013.01); *G06T 13/80* (2013.01); *G06T 3/20* (2013.01); *G06T 3/40* (2013.01)

(58) Field of Classification Search
CPC .... G04B 45/0015; G04B 47/044; G04G 9/00; G04G 21/08; G06T 3/20
See application file for complete search history.

(56) References Cited

U.S. PATENT DOCUMENTS

| | | |
|---|---|---|
| 4,355,380 A | 10/1982 | Huguenin et al. |
| 5,528,559 A | 6/1996 | Lucas |
| 6,449,219 B1 | 9/2002 | Hepp et al. |
| 7,505,370 B2 | 3/2009 | Rydgren |
| 7,515,508 B1 | 4/2009 | Stotz |
| 9,348,320 B1 | 5/2016 | Defazio et al. |
| 9,791,833 B1 | 10/2017 | Lider et al. |
| 2004/0233788 A1 | 11/2004 | Plancon et al. |
| 2004/0233791 A1 | 11/2004 | Plancon et al. |
| 2011/0001636 A1 | 1/2011 | Hedrick |
| 2012/0066714 A1 | 3/2012 | Son et al. |
| 2012/0113766 A1* | 5/2012 | Comeau ................ G04G 9/02 368/239 |
| 2014/0194241 A1 | 7/2014 | Stotz |
| 2016/0306328 A1 | 10/2016 | Ko et al. |
| 2017/0068217 A1 | 3/2017 | Chen et al. |
| 2017/0075305 A1 | 3/2017 | Ryu et al. |

FOREIGN PATENT DOCUMENTS

WO 2016141393 A1 9/2016

* cited by examiner

*Primary Examiner* — Edwin A. Leon
*Assistant Examiner* — Jason M Collins
(74) *Attorney, Agent, or Firm* — Carmody Torrance Sandak & Hennessey LLP

(57) ABSTRACT

An electronic device including at least one analog information indicator, a digital display for displaying information and/or images, and a controller, wherein the controller positions the information and/or image(s) to simulate physical interaction between the information and/or images displayable on the digital display and the at least one analog information indicator.

18 Claims, 12 Drawing Sheets

ELECTRONIC DEVICE WITH SIMULATED ANALOG INDICATOR INTERACTION WITH DIGITAL INFORMATION/IMAGES

BACKGROUND OF THE INVENTION

The present invention is directed to electronic devices generally, and preferably, to a wearable electronic device comprising at least one analog information indicator, a digital display for displaying information and/or image(s), and a controller, coupled to the at least one analog information indicator and for controlling the positioning of the at least one of information and image(s) on the digital display to simulate interaction between the at least one of information and image(s) displayable on the digital display and the at least one analog information indicator.

Timepieces that comprise analog indicators (e.g. hour and minute hands, etc.) along with digital displays are widely known. For example, in U.S. Pat. No. 9,348,320 the watch hands may be rotated to different locations to avoid obscuring the information being displayed on the digital display.

However, the prior art is deficient in any description or suggestion of a electronic device, preferably, but not necessarily in the form of a wearable electronic device, that provides for the simulated interaction between the information and/or images displayable on the digital display and the at least one analog information indicator. For example and not limitation, the simulated interaction could be wherein a simulated barrier is created by the use of the at least one analog information indicator such that the information and/or images displayable on the digital display appear not to be able to pass (e.g. is/are blocked) by the indictor, or the simulated interaction could be wherein the information and/or images displayable on the digital display simulates contact (e.g. simulated physical contact) with the at least one analog information indicator. Other examples and embodiments are disclosed herein.

Such examples and embodiments, as well as the present invention in a more general sense, provides for unique manners in which information can be conveyed and/or images can be displayed. In addition, the present invention provides for increased versatility and enjoyment of the user with the electronic device and further contemplates the ability to appreciate a multitude of functionality, such as being able to check the weather, play games, obtain information about sports highlights and/or receive sports notifications, and/or use the device as a compass, and/or be used with fitness and/or fitness apps and/or other "well-being" monitoring, as just a few examples, individually or with others, as will be disclosed below.

It is thus believed that further advances to the state of the art are both desirable and achievable, all of which are provided by the embodiments disclosed herein. It is also desirable to provide methodologies to carry out the foregoing functionality, which are also disclosed herein.

SUMMARY AND OBJECTIVES OF THE INVENTION

It is thus an objective of the present invention to overcome the perceived deficiencies in the prior art.

Specifically, it is an objective of the present invention to provide an electronic device that provides for the simulated interaction of information and/or image(s) displayable on the digital display with at least one analog information indicator. Preferably, the device is wearable about a wrist or a neck, but could equally be applicable as a device to be built into a dashboard of a boat or the like (e.g. used for weather readings and/or a compass, as just two examples thereof).

In connection with the above, it is another objective of the present invention to provide unique ways in which information can be conveyed and/or images can be displayed.

It is still a further objective of the present invention to provide for increased versatility and enjoyment of the user with the electronic device and/or the ability to check the weather, play games, obtain information about sports highlights and/or receive sports notifications, and/or use the device as a compass, and/or be used with fitness and/or fitness apps and/or other "well-being" monitoring, as just a few examples, all and each of which can be achieved and carried out individually and/or with others.

Still a further objective of the present invention is to provide methodologies for carrying out and/or facilitating the foregoing.

Further objects and advantages of this invention will become more apparent from a consideration of the drawings and ensuing description.

The invention accordingly comprises the features of construction, combination of elements, arrangement of parts and sequence of steps which will be exemplified in the construction, illustration and description hereinafter set forth, and the scope of the invention will be indicated in the claims.

Therefore, to overcome the perceived deficiencies in the prior art and to achieve the objects and advantages set forth above and below, a preferred embodiment of the present invention is, generally speaking, directed to an electronic device comprising at least one analog information indicator; a digital display for displaying at least one of information and image(s); and a controller, coupled to the at least one analog information indicator and for controlling the positioning of the at least one of information and image(s) on the digital display to simulate interaction between the at least one of information and image(s) displayable on the digital display and the at least one analog information indicator.

In another preferred embodiment, the invention is directed to a method of displaying at least one of information and an image on a digital display of an electronic device, wherein the electronic device comprises at least one analog information indicator; a digital display for displaying the at least one of information and image(s); and a controller, coupled to the at least one analog information indicator and for controlling the positioning of the at least one of information and image(s) on the digital display to simulate interaction between the at least one of information and image(s) displayable on the digital display and the at least one analog information indicator, wherein the method comprises the steps of displaying the at least one of information and image(s) on the digital display; moving the at least one of information and/or an image(s) on the digital display; and simulating interaction of the at least one information and image(s) displayed on the digital display with the at least one analog information indicator.

In a preferred embodiment, the electronic device is wearable, and in a specific preferred embodiment, the wearable electronic device is a timepiece in the form of a wristwatch, although it could be perceived that other wearable devices other than only a timepiece can be provided with the functionality set forth herein and thus equally provide the above and hereinafter mentioned advantages and benefits.

BRIEF DESCRIPTION OF THE DRAWINGS

The above set forth and other features of the invention are made more apparent in the ensuing Description of the Preferred Embodiments when read in conjunction with the attached Drawings, wherein.

Identical reference numerals in the figures are intended to indicate like parts, although not every feature in every figure may be called out with a reference numeral.

DETAILED DESCRIPTION OF THE PREFERRED EMBODIMENTS

Generally speaking, the present invention and the preferred embodiments thereof are directed to an electronic device, and preferably a wearable electronic device, and preferably in the form of a timepiece and a wristwatch in particular, in which there is simulated physical interaction between information and/or image(s) displayable on the digital display and at least one analog information indicator. Based thereon, unique ways in which information can be conveyed and/or images can be displayed are provided.

Further advantages of the inventive embodiments disclosed herein can be appreciated using additional analog indicators (e.g. watch hands) and/or different positioning thereof about the display, but this should all be understood by those skilled in the art after reading the present disclosure.

As will also be disclosed and understood herein, the advantages and features of the present invention are preferably achieved by the combination of a digital display (either implemented as a watch dial, positioned below the watch dial, positioned above the watch dial, or part of a watch dial with the display located intermediate the top of the movement and below the watch hands or as a transparent or semi-transparent display integrated with watch crystal located above both the dial and the hands) and a watch movement that has control of the hands. Control of the/any movement (and/or stopping, bouncing, etc) of the information and/or image(s) about the digital display is achieved via software programming in the electronic device 10 to coordinate the simulated physical interaction between the information and/or image(s) displayable on the digital display and the one or more indicator hands, the details of which is disclosed herein.

Figure 1:
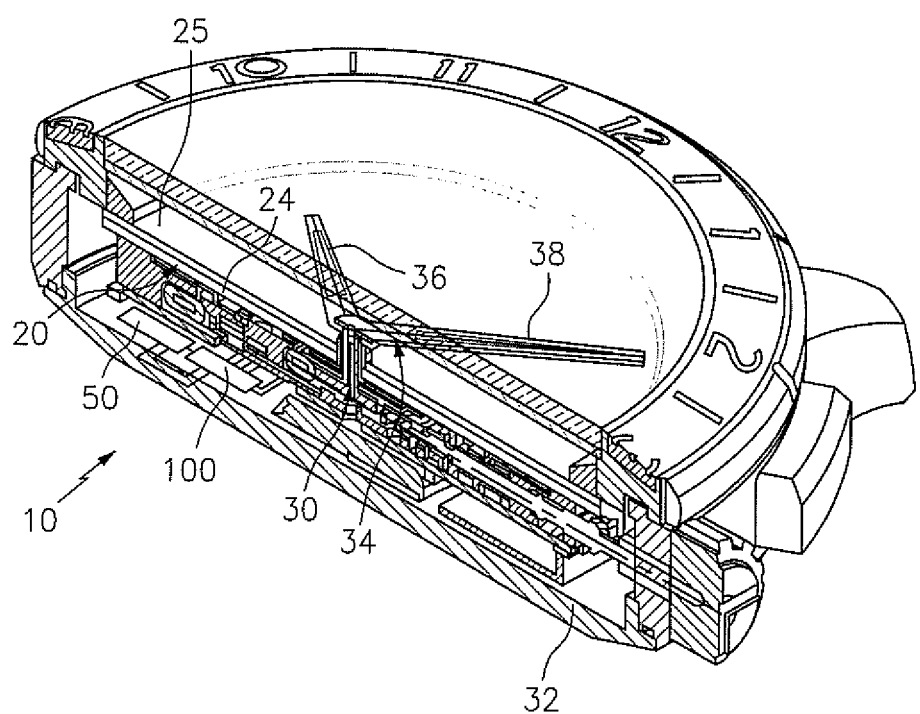
FIG. 1 illustrates an electronic device in accordance with a first preferred embodiment of the present invention, shown in partial cross-section, illustrating a digital display positioned below one or more analog information indicators.
Figure 2:
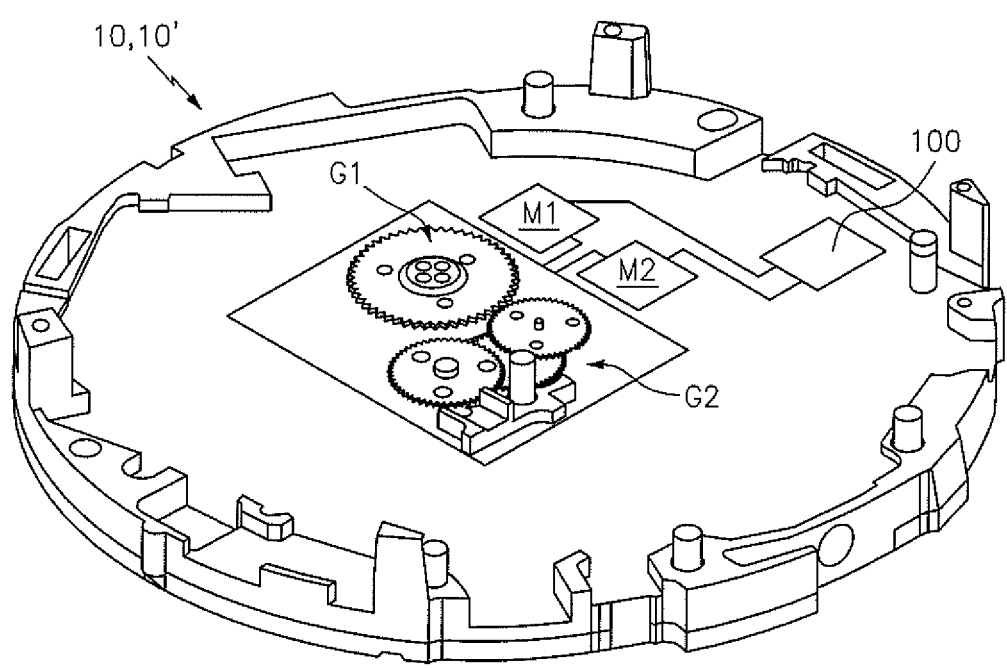
FIG. 2 is a perspective view disclosing stepper motors and/or micro-electromechanical system (MEMS) driving arrangements, generically indicated at M1, M2, for respectively linearly and/or rotationally moving hands 36, 38 (or 39 or 41 in FIG. 6K or 6M, respectively) via respective generic gear assemblies G1, G2, all for an electronic device constructed in accordance with all the embodiments disclosed herein. The position of the motors or driving arrangements M1, M2, as well as the size and position and other parameters of the gearing assembly or assemblies associated with each of M1 and/or M2 to rotate and/or otherwise move a respective indicator would be one of design choice and well within the purview of one skilled in the art. To this end, the subject matter of coowned U.S. Pat. No. 7,515,508, entitled "Indicator Assembly For A Wearable Electronic Device," and U.S. Pat. No. 8,926,465, entitled Bidirectional MEMS Driving Arrangement," and pending application Ser. No. 15/704,405, entitled "Bidirectional Mems Driving Arrangements with a Force Absorbing System" are each and all incorporated by reference as if fully set forth herein.

It should first be understood that FIG. 1 is directed to a first preferred embodiment of the present invention, in which the electronic device, preferably but not necessarily a wearable electronic device, comprises a digital display assembly provided below the analog display assembly. Although not explicitly shown herein, but disclosed sufficiently for those skilled in the art, the present invention is also applicable to another alternative embodiment in which the digital display assembly may be provided above the analog display assembly as disclosed in U.S. application Ser. No. 15/260,655, the subject matter of which is incorporated by reference as if fully set forth herein.

With reference thus first being made to FIG. 1, shown therein is an electronic device, generally indicated at 10, constructed in accordance with a first embodiment of the present invention, in which the digital display assembly is provided below a dial 25 and the analog display assembly. In an alternative embodiment, the preferred digital display, being an LCD, may act as the dial itself.

Thus, in accordance with the preferred embodiments, electronic device 10 comprises a digital display assembly, indicated generally at 20, comprising a digital display 24, which is preferably of the LCD or OLED type, by way of example and not limitation. An analog display assembly, generally indicated at 30, is provided in a case or housing 32. An analog display, generally indicated at 34, is part of analog display assembly 30.

According to an exemplary embodiment of the present invention, digital display 24 may be a twisted nematic type liquid crystal cell or an electrophoretic display, such as those developed by e-ink. But other types of displays are equally applicable as would be understood by those skilled in the art. It is also well known in the art how to program and arrange for a controller, such as controller 100 as disclosed herein, to control the display of information and/or images on the digital display 24.

In preferred embodiments of the present invention, analog information indicators 36, 38 may be used for time information (e.g. "time of day"), but other information may be displayed and/or conveyed by the use of the analog indicator hands 36, 38, examples of which may be found in U.S. Pat. No. 7,113,450, entitled "Wearable Electronic Device With Multiple Display Functionality," the subject matter of which is incorporated by reference as if fully set forth herein. The construction of an analog display assembly should also be known to those skilled in the art and therefore, the present disclosure omits, for purposes of brevity, certain basic and very well-known concepts regarding the construction of analog timepieces. For example, the basic construction and arrangements of gears and/or gear trains to rotate a plurality of "standard" hands all supported on a center stem, such as an hour hand and a minute hand, are omitted as being well within the purview of one skilled in the art.

Figure 6B:
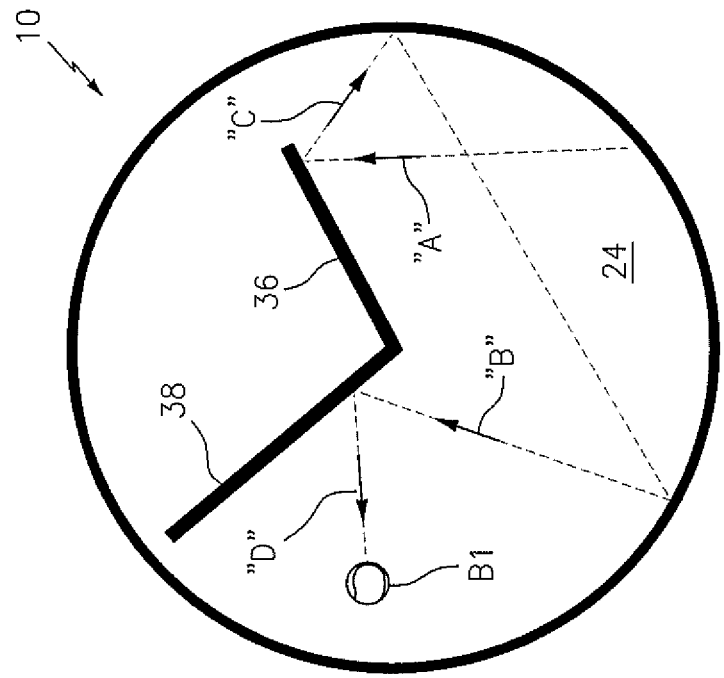
FIGS. 6A-6N illustrate electronic devices in accordance with preferred embodiments of the present invention, and in particular, the displays thereof, showing exemplary positioning, movement of information and/or image(s) and simulated interaction of the information and/or image(s) displayable on the digital display with the analog information indictor(s), as will be more fully disclosed herein.

However, for completion, the following is set forth for the convenience of the reader. In order to carry out all the functionality set forth and/or contemplated herein, electronic device 10, preferably in the form of a wearable timepiece, such as a wristwatch for example, may be provided with one or more subassemblies, each of which may comprise at least one stepper motor and/or MEMS driving assembly (examples of the latter being disclosed in U.S. Pat. No. 8,926,465, entitled Bidirectional MEMS Driving Arrangement" and pending application Ser. No. 15/704,405, entitled "Bidirectional Mems Driving Arrangements with a Force Absorbing System" the subject matter of each being incorporated by reference as if fully set forth herein) coupled to one or more gears if needed, which would in turn be coupled to the respective information indicator as would be understood by those skilled in the art. As would be understood, the rotation of a minute hand and an hour hand typically requires only one stepper motor or MEMS driving arrangement, but to maximize the functionality of the present invention, each analog information indicator preferably has associated therewith its own respective stepper motor or MEMS driving arrangement. The figures illustrate generic stepper motors or MEMS driving arrangements M1, M2, which may be used to individually rotate and/or linear move respective analog information indicators 36, 38 (or 39 or 41 as shown in FIG. 6K or 6M, respectively) as would be understood in the art.

As would also be understood in the art, the specific location of such motor(s) or MEMS driving arrangements is one of design choice and dictated by constraints such as spacing, power and torque requirements and the desired positioning of the analog indicators. As would also be understood in the art, the specific location, size, ratio, etc. of the gears or gearing assemblies associated with each of such motor(s) and/or MEMS driving arrangement(s) to rotate or otherwise move a respective indicator is also one of design choice and dictated by constraints such as spacing, power and torque requirements and the desired positioning of the analog indicators.

As an exemplary configuration, motor or MEMS driving arrangement M1 is provided to rotate or move analog information indicator 36 and motor or MEMS driving arrangement M2 is provided to rotate indicator 38, each through respective gear trains (if needed), as should also be understood by those skilled in the art. To be sure, either motor or MEMS driving arrangement M1, M2 could be used to linearly move analog indicator 39 shown in FIG. 6K. A suitable linear assembly to move an analog indicator linearly is disclosed in U.S. Pat. No. 7,515,508, entitled "Indicator Assembly For A Wearable Electronic Device" the subject matter of which is incorporated by reference as if fully set forth herein.

Figure 3:
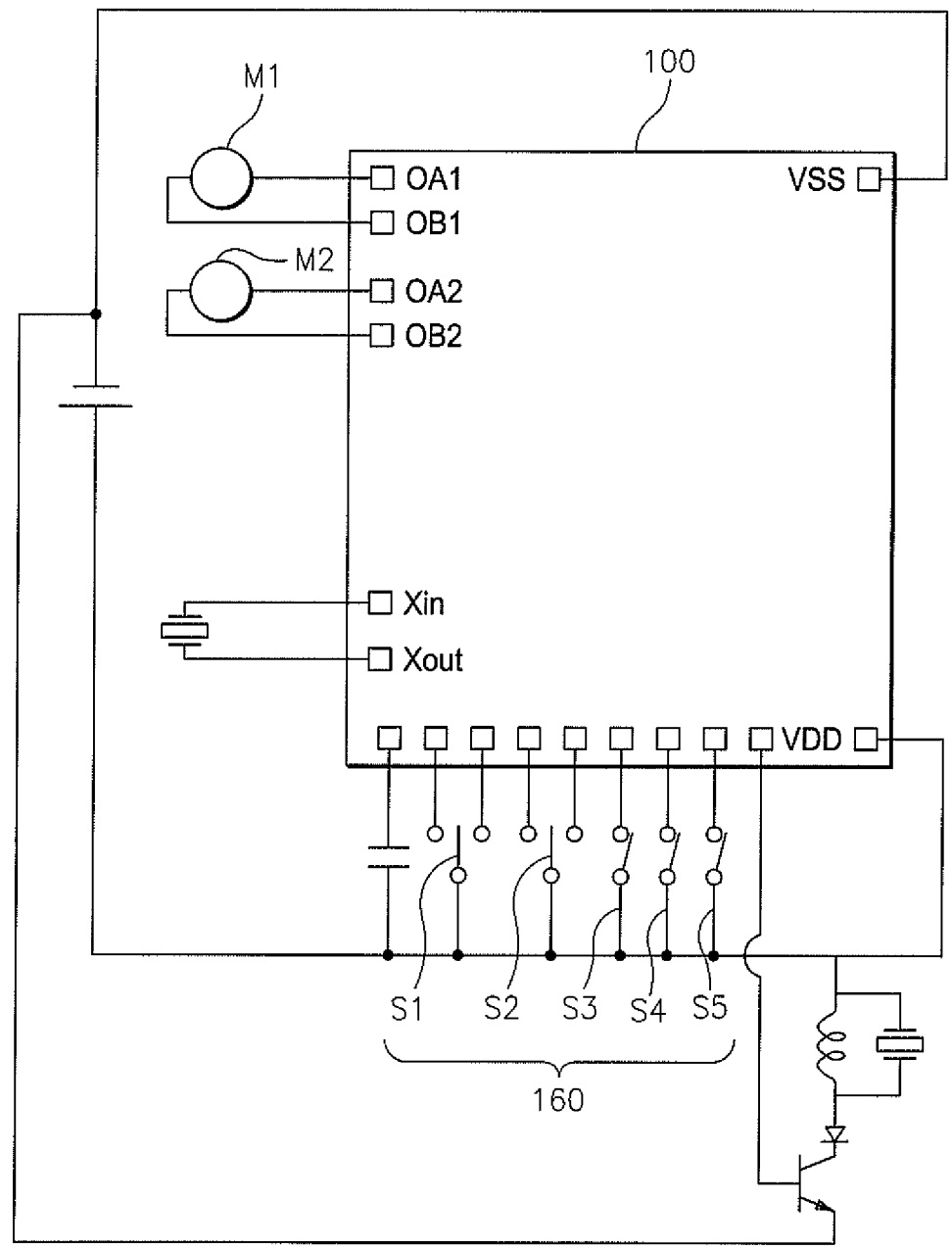
FIGS. 3-5 are block diagrams showing among other things, a controller for use in electronic devices constructed in accordance with the preferred embodiments of the present invention.
Figure 4:
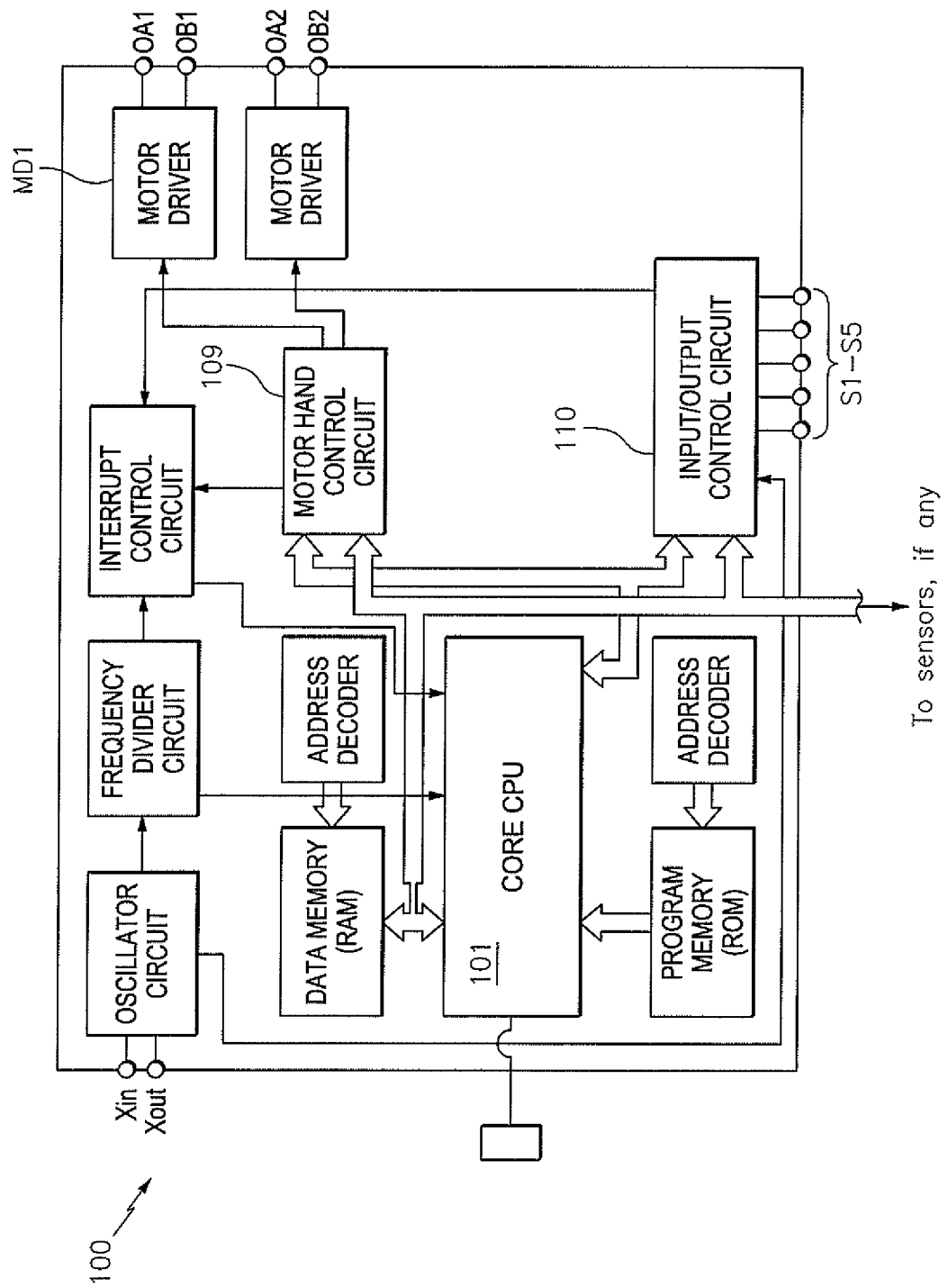
Figure 5:
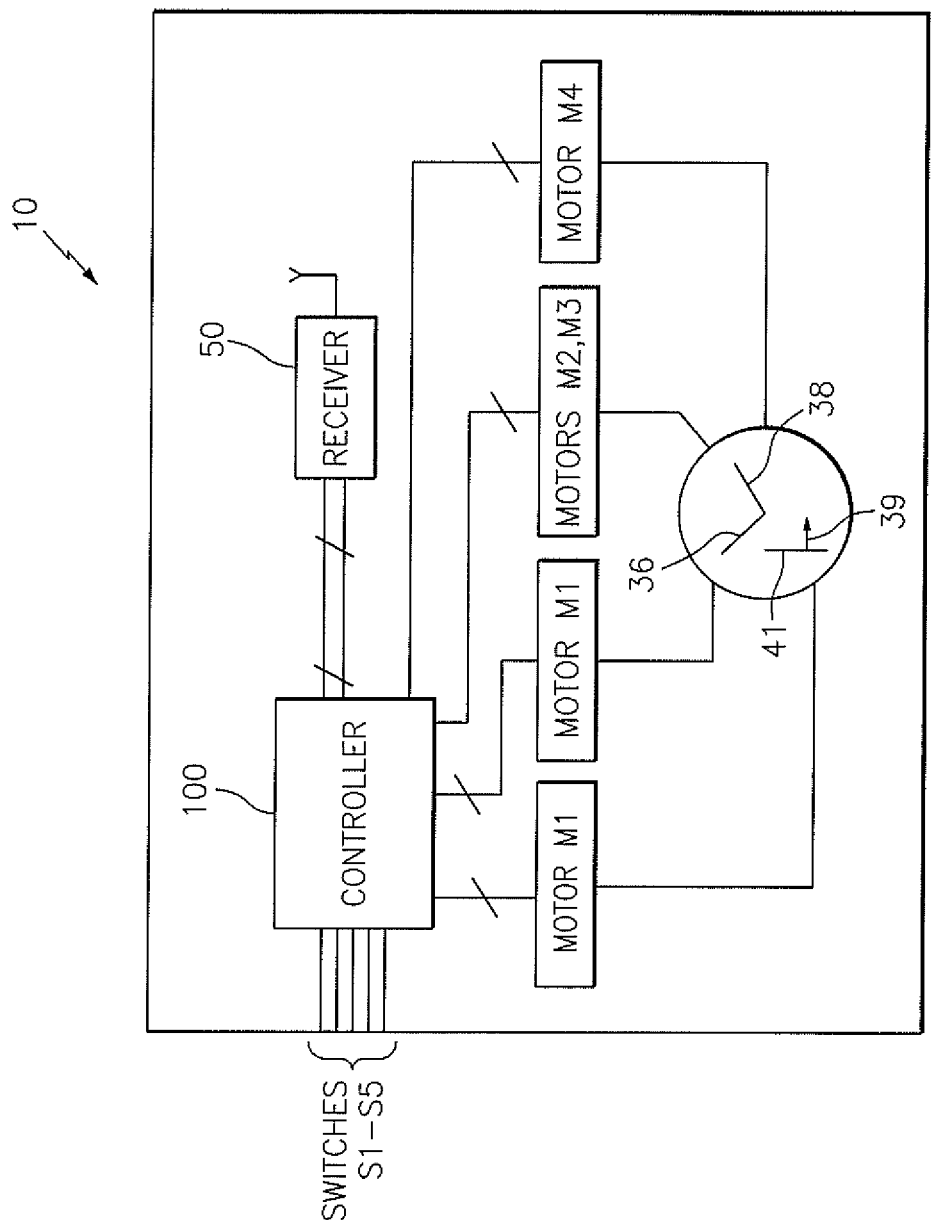

FIGS. 3-5 illustrate many additional features in accordance with the present invention, including details of controller 100 for providing the proper and accurate controlling, positioning and rotation of the one or more analog information indicators as well as the software as would be understood to those skilled in the art for the controlling of the movement of the information and/or image(s) on the digital display, as well as the stopping, simulated contact, simulated bouncing, simulated movement on and/or along the analog indicators, growing and/or enlarging, etc. of the information and/or image(s) displayable on the digital display 24. Many details of controller 100 can be found in the aforementioned U.S. Pat. No. 7,113,450 by reference to controller 100, and the controller 100 of the present invention preferably comprises all of the functional features described therein to carry out the objectives and features of the present invention. Added functionality particular to the present invention is also disclosed herein.

For example, FIGS. 3-5 illustrate among other things, interface connections to motors/MEMS driving arrangements M1, M2 as well as pushers, which are illustrated schematically as switches S1-S5. However, it is understood that the switches are also intended to generically indicate both side/top mounted pushers 160, as well as side mounted rotatable crowns, and thus respond to the actuation (i.e. pulling and/or pushing) action thereof. As would be understood with a conventional digital wristworn device, actuating of one of the pushers may cause the device 10 to enter the various modes (e.g. weather, play games, obtain information about sports highlights and/or receive sports notifications, and/or use the device as a compass, and/or be used with fitness and/or fitness apps and/or other "well-being" monitoring) as disclosed and/or contemplated herein to carry out the display modes such as those disclosed and/or contemplated herein.

FIGS. 4 and 5 illustrate block diagrams, including of controller 100. Particular reference is made to motor control circuit 109, which receives a commanded "next number of pulses" from CPU core 101 and generates the pulsed and phased signals necessary to move a desired motor/MEMS driving arrangement (e.g. M1 and/or M2) a desired amount and in a desired direction. Pulse outputs of motor control circuit 109 are buffered by drivers MD1, MD2 and applied to the respective motors/MEMS driving arrangements M1, M2, etc. as the case may be. An input/output control circuit 110 can controls any crown/stem actuations and/or pushbutton switches S1-S5 and provides such signaling information to CPU 101.

As would be understood in the art and exemplary shown in the figures, the motors (e.g. stepper motors) would comprise a rotor, or, in the case of a MEMS driving arrangement, would comprise a driven wheel and a driving actuation assembly for causing rotation of the driven wheel as disclosed in the aforementioned patent and pending application directed thereto. In either embodiment, the motors or the MEMS driving arrangement are operatively coupled to controller 100, wherein the stepper motor or MEMS driving arrangements step/move in at least one of a clockwise and counterclockwise direction in response to commands from the controller 100, wherein the rotor of each stepper motor or the driven wheel of the MEMS driving arrangement is coupled to its respective analog information indicator, and wherein the rotation of rotor or wheels as the case may be causes the rotation (or linear movement, as the case may be) of the respective analog information indicators in at least one of the clockwise and counterclockwise directions or linearly, respectively, and in predefined increments.

In a preferred embodiment, the movement of the indicators, e.g. hands 36, 38 and the content of the digital display 24 are both either controlled by functions residing together on a single main processor or distributed between two or more processors (collectively referred to as "controller 100," whether as a single processor or between two or more processors) where the functions can exchange relevant information. Through that exchange, the function that controls the information and/or images that is/are shown moving, stopping, "bouncing," etc. on display 24 is always aware of where the indicators, i.e. hands 36 and/or 38 are positioned. Knowledge of the location of the indicators, e.g. hands 36, 38 is typically achieved via a calibration action (either manual or automatic) that takes place. One well known calibration method, which is disclosed in U.S. Pat. No. 7,266,051, the subject matter of which is incorporated by reference as if fully set forth herein) is where the hands are moved to a known reference location and the function that controls the hands is informed when the hands are at the reference location. Since the function knows where the hands are at that point and given that the only method for the hands to move are from commands from the function, and the hand movement amount is deterministic, the function always knows where the hands 36, 38, 39 are (unless for some reason they fall out of alignment typically due to some sort of mechanical failure at which point the hands would need to be recalibrated). The indicators 36, 38 can also be commanded to move via physical input from the electronic device 10 itself (i.e. pushers or a crown). However, these input methods simply send signals to the function that then commands the hands 36, 38 to move in specific increments. There exists other art where a user interface on a smart phone sends commands to the watch to move the hands. Again, in this case the signals are routed to the function that commands the hands to move in specific increments. In other words, the preferred and/or only way to move the hands is via the function that controls the hands 36, 38, 39. If the function that controls the hands is located on a different processor from the function that controls the information and/or image(s) displayable on the digital display 24, there exist well known methods where the function that controls the hands can transmit information to the function that controls what information and/or image(s) is displayed on the digital display 24 to inform that display function of the current hand location.

Given then that the function that controls the movement/stopping, etc. of the information and/or image(s) that are shown on the digital display 24 also knows where the indicators (e.g. 36, 38) are positionally relative to the digital display 24 (and more particularly, relative to the position(s) of the information and/or image(s) displayable thereon), the display function can render the information and/or images on the digital display 24 to appear that information and/or images appearing on the digital display are interacting (i.e. simulated physical interaction) with the indicator(s), e.g. hands 36 and/or 38 as disclosed and claimed herein.

Figure 6A:
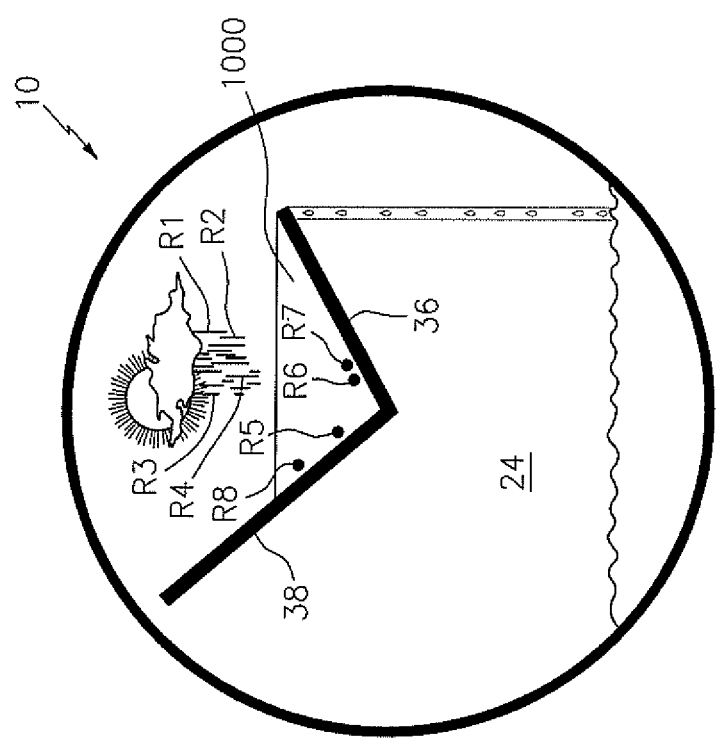
Figure 6D:
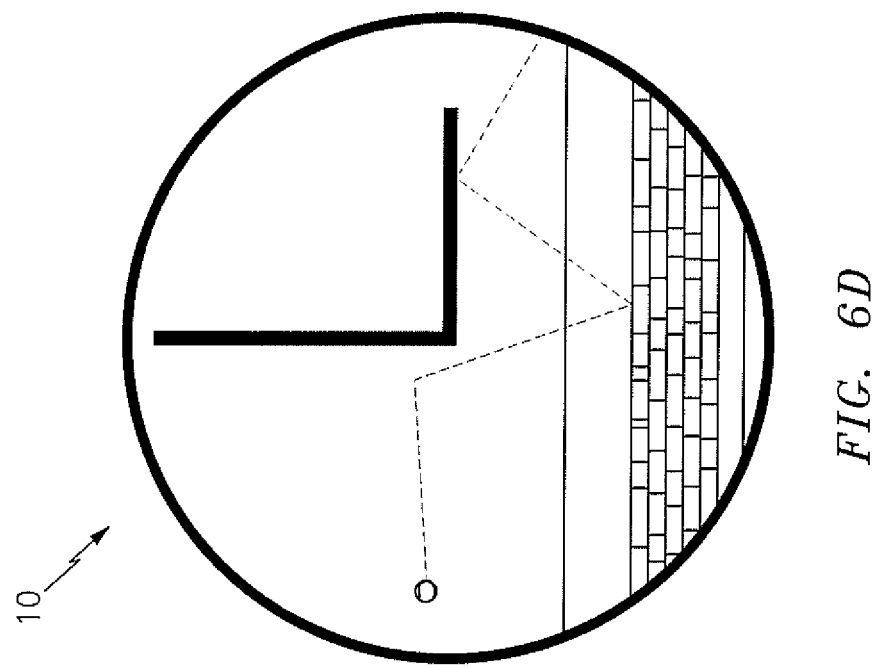
Figure 6C:
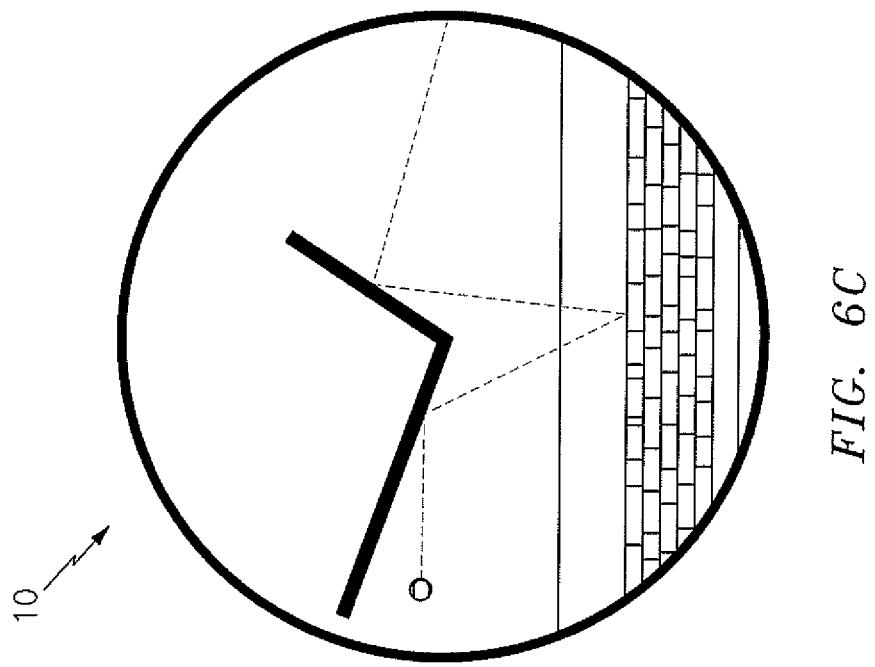
Figure 6E:
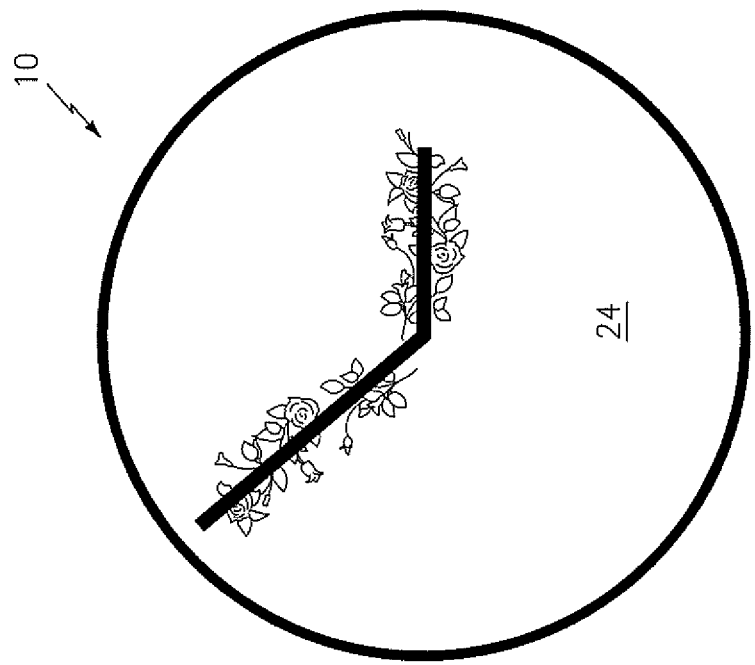
Figure 6F:
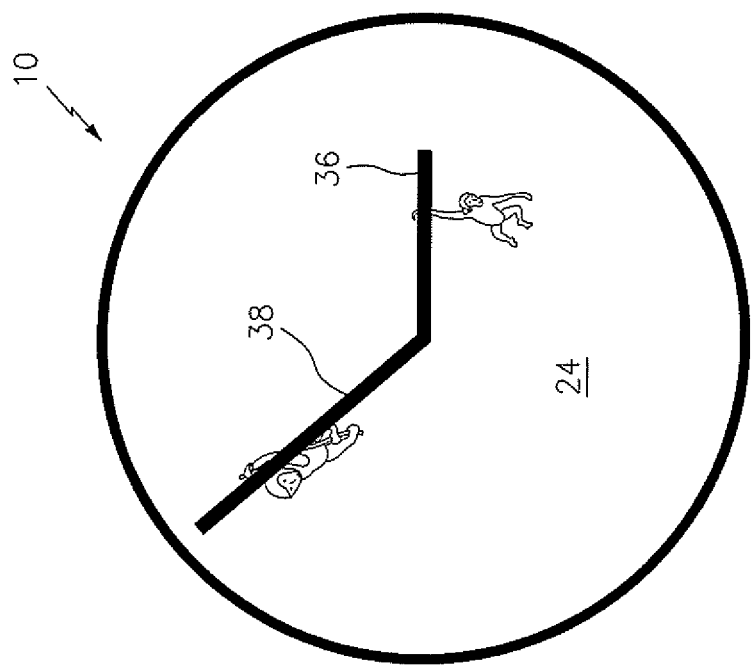
Figure 6H:
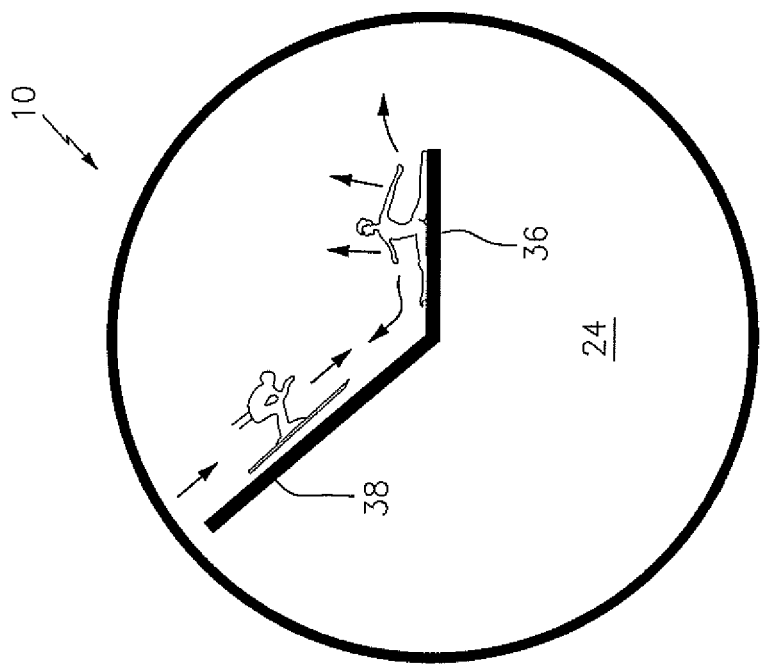
Figure 6G:
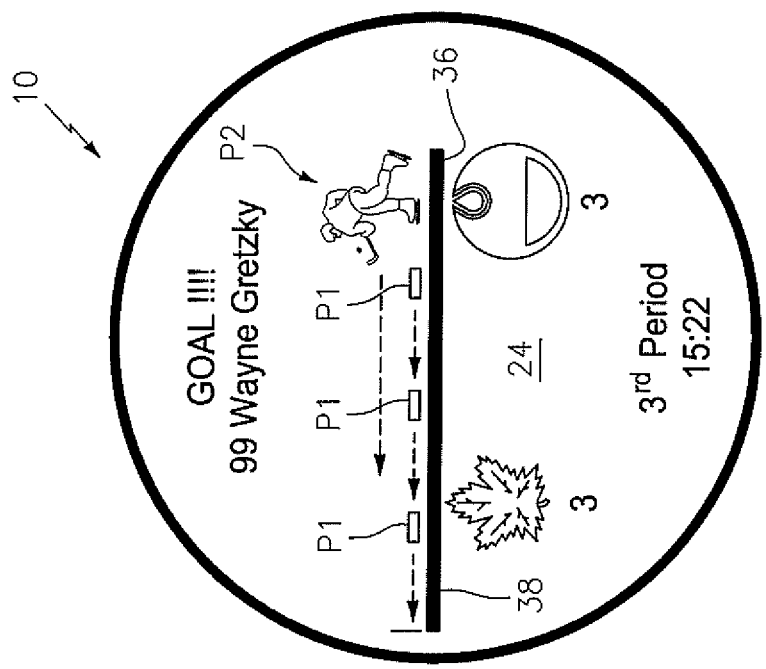
Figure 6J:
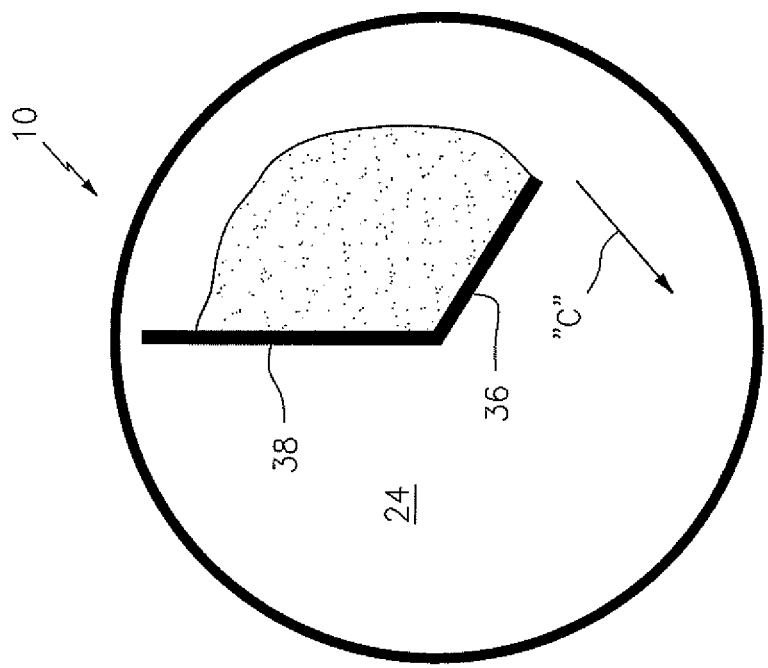
Figure 6I:
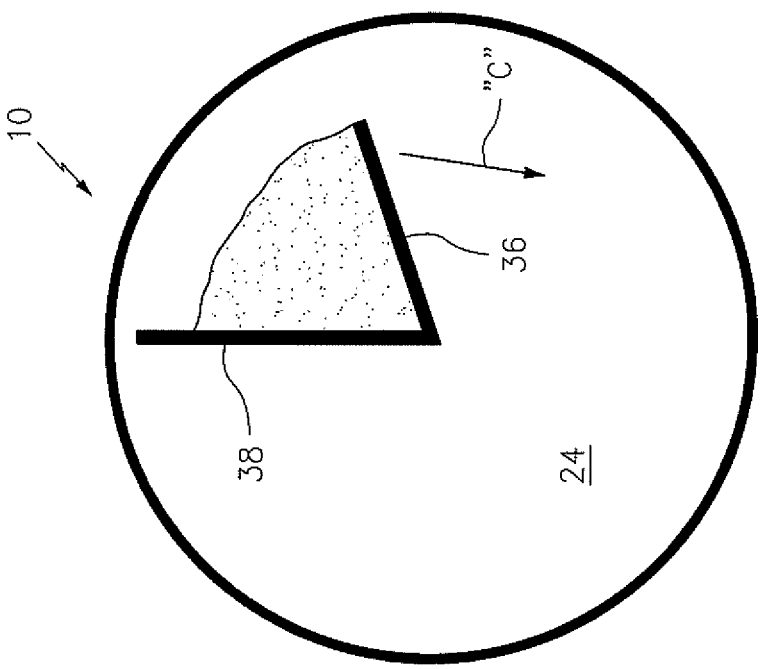
Figure 6K:
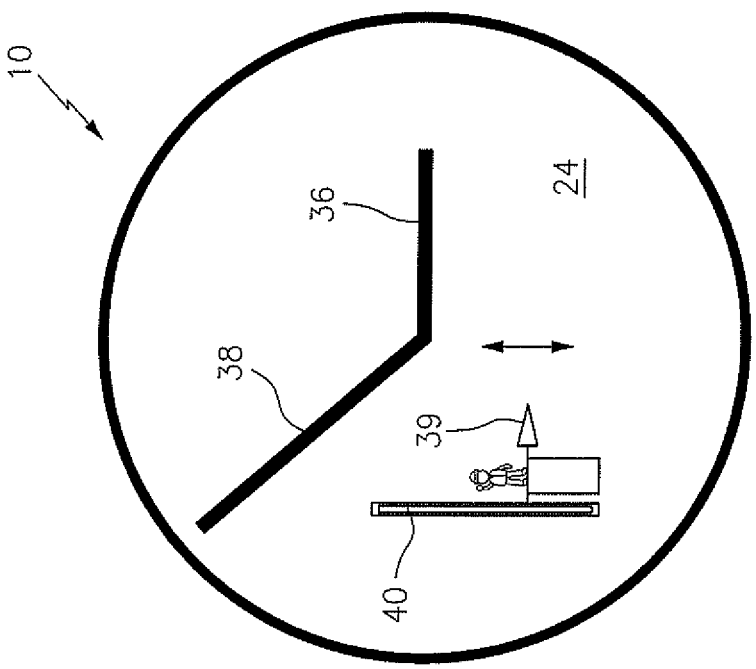
Figure 6L:
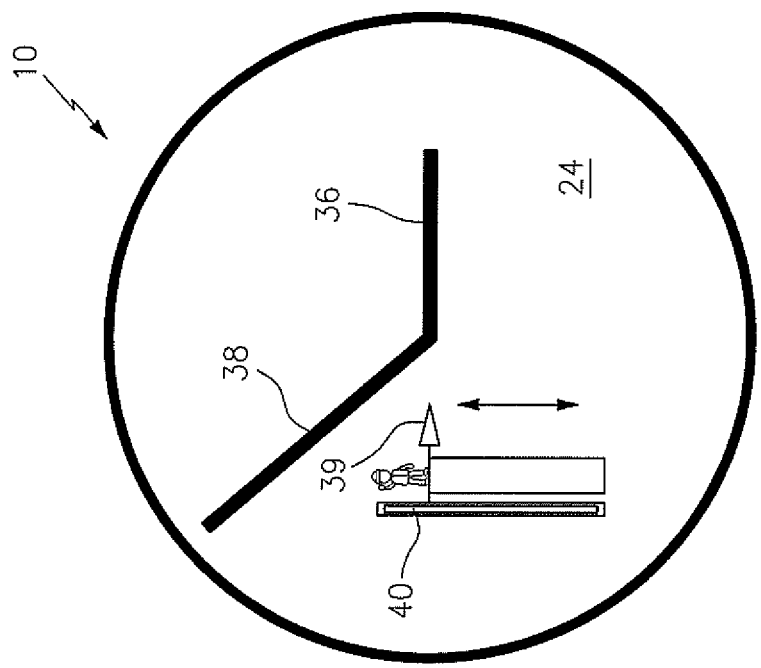
Figure 6M:
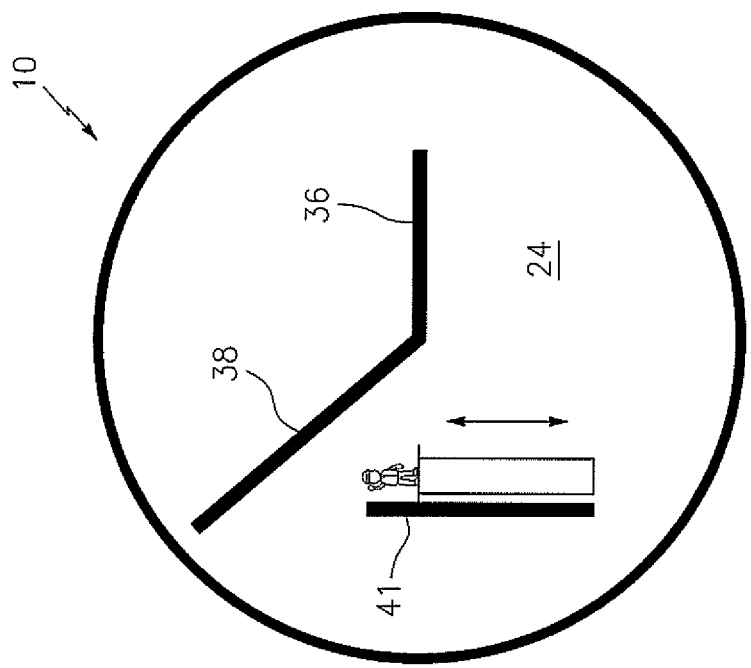
Figure 6N:
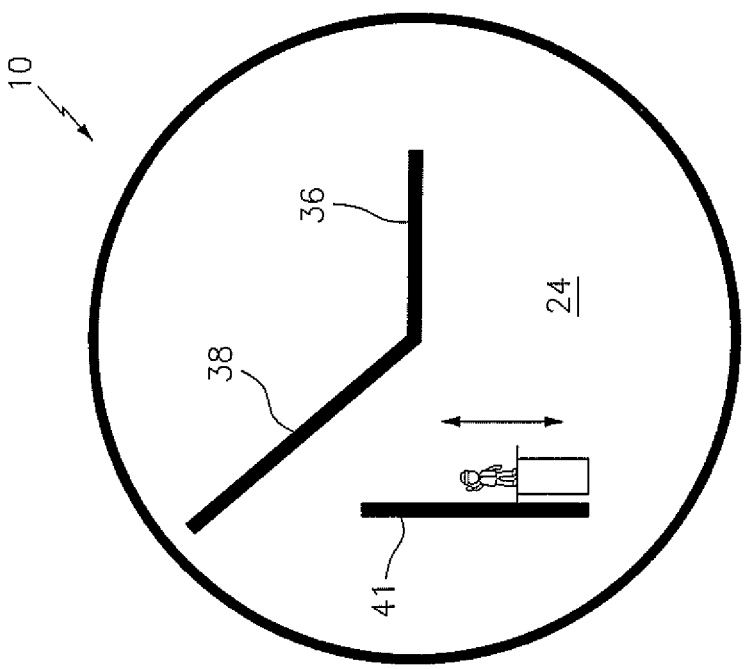

Reference is thus now made to FIGS. 6A-6N which illustrate various exemplary implementations of preferred embodiments of the present invention.

For example, with reference to FIG. 6A, shown therein is a simulated interaction of raindrops (and the gathering as a puddling of water) displayed on the digital display 24, wherein the raindrops can be characterized as either or both information (e.g. it is raining) and/or image(s), and at least one analog information indicator 36 or 38 (in the example of FIG. 6A, the raindrops R1, R2, etc are simulating interaction with both indicators 36, 38 as a puddling of water 1000). In particular, the simulation is one of a barrier (e.g. a simulated physical barrier) through which one or more raindrops (e.g. each raindrop being an image to provide the broadest reasonable interpretation of the claims) displayed on the digital display 24 first are seen to be moving downward from the cloud/sky towards the indicators 36, 38. Upon "hitting" the indicators, the raindrops R1, R2, etc. appear not to be able to pass by the indicators 36, 38, thus appearing as a gathering of water (thus a different image from a raindrop). To be clear, individual raindrops are seen to be falling towards the hands and could gather as individual raindrops and then appear as a puddle of water. Alternatively, the images could simply be considered "water." That is, the invention is not intended to subtlety turn on whether an image of raindrops "turn into" a puddling of water. That is, the at least one analog information indicator 36 and/or 38 simulates a barrier through which the at least one of falling information (raindrop(s), water) and image (raindrop(s), water) displayable on the digital display 24 appear not to be able to pass after falling from the simulated "cloud." As therefore shown and illustrated, the controller 100 causes the digital display to illustrate the falling and a stopping of moving of the raindrop(s) and/or water to simulate an inability to pass through (e.g. being blocked by) the at least one analog information indicator 36 and/or 38. Said a different way, but all to be understood as the same way in which the invention operates such that all constitutes the same functioning embodiment, the analog information indicator 36, 38 simulates a barrier, and the controller 100 controls the movement i.e. the positioning of the at least one of information and image(s) such that the at least one of information and image(s) displayable on the digital display appear to move (i.e. fall) and thereafter not to be able to pass through the simulated barrier (being the indicators 36 or 38). In this embodiment also, the controller 100 controls the positioning of the at least one of information and image(s) (e.g. raindrops just one example) to create a moving and a stopping of moving of the at least one of information and image(s) to simulate an inability of the at least one of information and image(s) to pass through the analog information indicator after the raindrops fall "against" the barrier indicators 36, 38.

In this FIG. 6A, the present invention illustrates the moving images of a plurality of raindrops across at least a portion of the digital display 24, and simulating a gathering of the plurality of the raindrops R1, R2, etc. as a puddling of water 1000 based on the simulated barrier created by the at least one analog information indicator 36 and/or 38. The feature that the raindrops/water appear as "leaking" over the edge of indicator 36 into a larger "pool of water" is just additional imagery provided by the present invention.

Although applicable to the display of FIG. 6A, also applicable to the display of FIGS. 6B, 6C, 6D is the embodiment wherein the at least one of information and image(s) displayable on the digital display simulates contact (i.e. physical contact) with the at least one analog information indicator (e.g. 36 and/or 38). That is, controller 100 causes at least one of a moving and a stopping of moving of the at least one of information and image to simulate the contact with the at least one analog information indicator. Here again, and all intended to be one functioning embodiment, it can be seen that the controller controls the positioning of the at least one of information and image(s) displayable on the digital display to simulate movement of the information or image(s) and contact with the at least one analog information indicator. Regarding the exemplary raindrops, the controller controls the positioning of the at least one of information and image(s) to create a moving and a stopping of moving of the at least one of information and image(s) to simulate the contact of the at least information and image(s) with the at least one analog information indicator.

For example, in the display of FIG. 6A, the falling raindrops/water appear to be contacting (e.g. resting on) the indicators 36 and/or 38. However, in the embodiment of FIGS. 6B, 6C, 6D, an image of a moving ball may be provided, with the dotted lines of (see FIG. 6B in particular) illustrating the movement of an image of the ball in a first direction (e.g. directions denoted "A" or "B") across at least a portion of the digital display 24, simulating a bouncing of the image of the ball against the at least one analog information indicator (36 and/or 38), and thereafter, moving the image of the ball in a direction different from the first direction (e.g. denoted directions "C" or "D"), so as to simulate the "bouncing" off the ball against the indicator(s) 36 and/or 38. In FIGS. 6C, 6D, this disclosed embodiment may be incorporated into a game where the user controls the movement of the hands to actively interact with the information or images on the display to break through "objects" depicted on the display 24.

As can thus be seen in both of the embodiments of FIG. 6A and FIGS. 6B-6D, the controller simulates physical interaction of the at least one of information and image(s) displayable on the digital display with the at least one analog information indicator. With the use of a second analog indicator, the controller likewise controls the movement, positioning and stopping/bouncing of the at least one of information and image(s) on the digital display to simulate interaction of the at least one of information and image(s) displayable on the digital display with the at least two analog information indicators. Whether with one or two or more analog indicators, the controller 100 simulates physical interaction of a plurality of images (raindrops, balls, objects, etc) by the moving and stopping and positioning of the at least one of information and image(s) displayable on the digital display with the at least one analog information indicator.

As illustrated in the foregoing embodiments, it is also clear that the embodiments herein may comprise at least a second analog information indicator and at least a motor or MEMS driving arrangement coupled to the at least second analog information indicator; and wherein the controller simulates interaction of the at least one of information (e.g. a raindrop, a plurality of raindrops, puddling water, text, words, etc) and images (e.g. a raindrop, a plurality of raindrops, puddling water, a bouncing ball, etc) displayable on the digital display 24 with the at least two analog information indicators, as illustrated in both FIGS. 6A and 6B-6D.

The present invention is quite versatile and other embodiments are contemplated herein. For example, FIG. 6E illustrates an exemplary embodiment in which it may be simulated that an animal 120 is hanging or resting on or more of the analog indicators 36, 38, while FIG. 6E illustrates an exemplary embodiment in which it may be simulated that a plant, such as rose vine by way of example, may be seen to be growing and/or enlarging on one or more of the analog indicators 36, 38. In such examples, the at least one analog information indicator 36, 38 simulates a surface to which the at least one of information and image(s) displayable on the digital display can adhere or be connected, and wherein the controller 100 controls the moving, growing, enlarging and thus the positioning of the at least one of information and image(s) (e.g. the animal, or the plant, etc.) such that the at least one of information and image(s) displayable on the digital display appear to adhere to the surface of the at least one analog indicator. In the specific examples shown in FIG. 6E or 6F, the controller may cause a simulated enlarging and/or growing of the at least one of information and image(s) (e.g. animal, word, text and/or plant) about the at least one analog information indicator. Such growth of the image (e.g. animal or plant) could represent a fitness level or activity in which the user is engaged. The rate of growth or movement (e.g. as the animal shown in FIG. 6E moves along the indicators from indicator 36 to indicator 38 for example) and as the case may be, could be used to represent an activity, an activity level, speed of the activity and/or an activity progress, just to name a few exemplary parameters. Similarly, movement of the animal along the indicator could represent a level and/or intensity of the activity as well. In such an embodiment, the at least one analog information indicator 36, 38 simulates a surface on which the at least one of information and image(s) displayable on the digital display moves, and wherein the controller 100 controls the positioning of the at least one of information and image(s) such that the at least one of information and image(s) displayable on the digital display appear to move and/or along the surface of the at least one analog indicator 36, 38.

Movement of the information and/or images could also be appreciated in additional embodiments, such as those illustrated in FIGS. 6G, 6H, in which the device could simulate a playing surface. For example, in FIG. 6G an alert could be provided from a sports app to indicate the scoring of a goal, where the indicators 36, 39 move to their 3 o'clock/9 o'clock positions and there is a simulated replay (e.g. for hockey, a simulation of the player P2 or puck P1 moves along the ice and "scores" in a displayed goal). Similarly and/or alternatively, FIG. 6G illustrates exemplary movements of a skier and gymnast along and/or on the simulated surface created by the indicators 36, 38. Such examples could likewise be used to display fitness activities, fitness levels and/or completeness of activities, just to name a few parameters. In this way, it can be seen that the electronic device of such an exemplary embodiment provides that the at least one analog information indicator 36, 38 simulates a surface on which the at least one of information and image(s) (hockey puck, skier, gymnast, etc.) displayable on the digital display moves, and wherein the controller controls the positioning of the at least one of information and image(s) such that the at feast one of information and image(s) displayable on the digital display moves on and/or along the surface of the at least one analog indicator. To be sure, the images that are displayable are only widely available and subject only to the creativity of the designer, as images could include football scoring, baseball and/or basketball scores, etc. Other images, such as uniform jerseys and programming to display ones favorite team(s) and scores is also contemplated herein.

In yet another embodiment as illustrated in FIGS. 6I and 6J, it can be seen that a positioning of the first and second analog information indicators 36, 38 can form a first angle therebetween, and wherein the at least one of information and image(s) (e.g. a solid color, objects, raindrops, balls, etc.) are used to fill a region between the first and second analog information indicators. FIG. 6J shows a passage of time in which there is a movement of at least one of the first and second analog information indicators (e.g. indicator 36 in the direction of arrow "C") to form an angle therebetween different from the first angle, and wherein the at least one of information and image(s) (e.g. color, balls, objects, raindrops, etc.) fill a region between the first and second analog information indicators. Such an example would be quite appreciated as a stopwatch or timer feature, where visual movement of the hands by the simulated "filling" of the region therebetween is enhanced for the user. In such embodiments, it can be seen that the information or images are illustrated as "adhering" to the indicators 36, 38.

FIGS. 6K, 6L illustrate another example wherein the controller 100 controls the movement and positioning of the at least one of information and image(s) such that the at least one of information and image(s) appear connected to an analog information indicator 39 as the at least of information and image(s) appears to be adhered to and "pulled" by the analog information indicator 39. In this embodiment, it can be seen that the characters appear to adhere to and/or rise (and/or grow) as the indicator 39 moves up and down, which again could indicate a level of fitness, completeness level of an exercise, a fulfillment of a programmed activity, or any other parameters that could be envisioned by one skilled in the art. It is shown here that linear indicator 39 is extending out of slot 40. In this way, controller 100 controls the positioning of the at least one of information and image(s) such that the at least one of information and image(s) appear connected to the at least one analog information indicator such that movement of the at least one analog information indicator appears to move (e.g. pull) the at least of information and image(s) with the at least one analog information indicator 39. 34. In this way, it can be seen that there is a step of simulating a connection of the at least one analog information indicator with the at least one of information and image(s) such that movement of the at least one analog information indicator appears to move the at least of information and image(s) with the at least one analog information indicator.

Lastly, FIGS. 6M, 6N illustrate an example by which the controller 100 controls the positioning of the at least one of information and image(s) such that the at least one of information and image(s) appear connected to the at least one analog information indicator 41 as the information or image (e.g. the character on the bar) appears to move up and along information indicator 41.

Other more well-known features of a digital and/or analog display, such as wiring and/or other mechanical or electrical assemblies are omitted for brevity and because such technology is also well-known in the art.

Moreover, it might be the case that analog indicators 36, 38, 39, 41 function as time of day indicating hands, e.g. hour, minute, but it should be understood that these configurations are but only examples and the use of the number of hands, their function and their positions as shown in the figures are but only examples of the versatility of the present invention as more or less hands are envisioned herein.

As stated above, the advantages of the present application are fully appreciated by the use of just one indicator, e.g. indicator 36, 38, 39, 41. However, in the preferred embodiment, the present invention will utilize at least two of the aforementioned analog information indicators, e.g. 36, 38, whether positioned as illustrated or elsewhere on the display. It should be understood that the foregoing positions of any of the aforementioned indicators are by way of example and not limitation as almost an infinite number of variations are envisioned hereby.

Thus from a time $T_0$ where the indicators 36, 38 may be displaying current time information, it will come a time (e.g. $T_1$) when the digital display 24 will be utilized to display information and/or images as disclosed herein. Actuation of a pusher may initiate any of the modes contemplated herein to cause information and/or images to be displayed on the digital display 24 as disclosed herein.

A further feature of the present invention is the ability for controller 100 to cause, via the controlling of the respective motor(s) or MEMS driving arrangements M1, M2, the analog information indicators 36, 38 to rotate at a desired rate (e.g. faster than a conventional TOD second hand would normally rotate) until the analog information indicators 36, 38 are at their positions should the mode dictate. That is, it is envisioned that all the modes contemplated herein may not require the indicator hands to move specifically for the modes contemplated herein, but such is a possibility. Thus, after the controller 100 causes the indicator(s) 36, 38 to rotate based on the information and/or images to be displayed on the digital display 24, 124, there may come a time that the indicators 36, 38 will need to be updated to their respective position(s) at which the indicator(s) would have been had it/they not been positioned based on the modes (e.g. weather, games, receipt of sports notifications, compass, fitness and/or other "well-being" monitoring, bouncing ball, etc) being displayed on the digital display 24. This is also contemplated herein by the controller rotating the indicators at a faster than normal rate (e.g. faster than a TOD seconds-hand would rotate) until the respective indicators reach its/their position at which it/they would have been had it/they not been repositioned earlier. Moreover, this "true up" rate of rotation of the indicators 36, 38 can easily be selected by one skilled in the art as a matter of design choice. Controller 100 then causes the hands to begin rotating again about the display 24 at their respective normal (e.g. TOD) rate, and device 10 returns to its "normal run" mode.

Important to the present invention's operability is the fact that controller 100 is able to maintain accurate control of the position and location of the information and/or image(s) on the digital display as well as the positioning of each of the indicators 36, 38, 39. That is, the controller must maintain and "know" the position of the indicators and the information and/or images on the digital display.

That is, whether it is the controlling of the positioning of the at least one of information and image(s) on the digital display to simulate interaction between the at least one of information and image(s) displayable on the digital display and the at least one analog information indicator by way of simulating a barrier with the indicator, creating a moving and a stopping of moving of the at least one of information and image(s) to simulate an inability of the at least one of information and image(s) to pass through the at least one analog information indicator, simulating contact between the information and/or image(s) with the at least one analog information indicator, simulating a surface to which the at least one of information and image(s) displayable on the digital display can adhere, having the information and/or images appear to move on and/or along the surface of the at least one analog indicator, causing a simulated enlarging and/or growing of the at least one of information and image(s) about the at least one analog information indicator, filling a region between the first and second analog information indicators and/or providing that the at least one of information and image(s) appear connected to the at least one analog information indicator such that movement of the at least one analog information indicator appears to move the at least of information and image(s) with the at least one analog information indicator, whether performed individually in different embodiments or combining any one or more of such features and functionality, it should now be clear that the above features and functionality are carried out by the controller maintaining knowledge of where the hands/indicators are located about the dial and controlling the illumination of lights, pixels, etc. of the digital display such that the information and/or images are intentionally moved/provided by the controller so as to intentionally appear to simulate contact, bounce, move along, move about, adhere, grow, enlarge, etc. on and/or about the one or more analog indicators. Based thereon, appropriate programming to provide the needed movement of the images on the digital display would be known by those skilled in the art. In this way, it is further contemplated that the analog indicators could also, for example, could continue to move rotationally or linearly (e.g. in a time-telling mode) such that the controller will simply alter/move the images accordingly. In just such an example, a monkey could cling/move about one of the analog indicators even though the analog indicators continue to move in their time of day mode. As just another example, in a weather mode, the controller would know to provide for the raindrops to fall just a little further if it were continuing to rain between 2:00 and 3:00 as the hour hand would be rotating further clockwise! That is, the present invention is directed to an intentional simulated interaction of the information and the images with the indicators, and not simply a random or coincidental movement of images on a conventional digital display that happens by coincidence to appear to be in the same or along a random path that is (e.g.) in-line with the analog hands. Nowhere in the prior art is there believed to be this intentional providing of the simulated interaction as disclosed and claimed herein.

Thus, also in accordance with preferred embodiments of the present invention, a method of displaying at least one of information and an image on a digital display of an electronic device (which is preferably wearable), wherein the electronic device comprises at least one analog information indicator; a digital display for displaying the at least one of information and image(s); and a controller, coupled to the at least one analog information indicator and for controlling the movement and/or positioning of the at least one of information and image(s) on the digital display to simulate interaction between the at least one of information and image(s) displayable on the digital display and the at least one analog information indicator, wherein the method comprises the steps of displaying the at least one of information and image(s) on the digital display; and simulating interaction of the at least one information and image(s) displayed on the digital display with the at least one analog information indicator.

In a preferred embodiment the method comprises the steps of moving information and/or images about the display and simulating a barrier through which the at least one of information and image(s) displayable on the digital display appears not to be able to pass, wherein the barrier is simulated by the at least one analog information indicator. In another preferred embodiment, the method comprises the steps of moving the at least one of information and image(s) across at least a portion of the digital display and simulating a barrier through which the at least one of information and image(s) appears not to be able to pass, wherein the barrier is simulated by the at least one analog information indicator.

In yet another preferred embodiment such as that disclosed in FIGS. 6B-6D, the method comprises the steps of moving an image in a first direction across at least a portion of the digital display, simulating a bouncing of the image against the at least one analog information indicator, and thereafter, moving the image in a direction different from the first direction. In a specific embodiment, the image may be that of a ball or other object.

In another preferred embodiment, such as that illustrated in FIG. 6A, the method comprises the steps of moving a plurality of images (e.g. raindrops) across at least a portion of the digital display, and simulating a gathering of the plurality of images against the at least one analog information based on the simulated barrier created by the at least one analog information indicator. Moreover, as shown across several of the disclosed embodiment, the method includes the steps of at least one of a moving and a stopping of moving of the at least one of information and image(s) across the digital display to simulate an inability to pass through a simulated barrier created by the at least one analog information indicator. This is illustrated in any of the embodiments where the image or information simulates bouncing off or otherwise appears to be blocked by the indicator.

FIGS. 6E, 6F, 6K, 6L, 6M, 6N illustrate yet another preferred method in which there is the step of simulating an adhering of the at least one of information and image(s) displayable on the digital display to the at least one analog information indicator. Yet again, preferred embodiments herein may simulate physical interaction of one or more images displayable on the digital display with the at least one analog information indicator.

FIGS. 6G, 6H are exemplary embodiments of a method comprising the steps of simulating a surface on which the at least one of information and image(s) displayable on the digital display appear to move and simulating movement of the at least one of information and image(s) on the simulated surface. In a specific embodiment, the method may comprise the steps of simulating movement of the at least one of information and image(s) along a simulated surface of the at least one analog information indicator, as illustrated in FIG. 6G.

FIG. 6F particularly exemplifies the method of simulating an enlarging and/or growing of the at least one of information and image(s) about the at least one analog information indicator, such as a plant or vine, although FIG. 6E, and/or FIGS. 6K, 6L, 6M, 6N could also exemplify this embodiment if the animals/images are illustrated to grow and/or enlarge. Yet another preferred method wherein a positioning of the first and second analog information indicators form a first angle therebetween, the method comprises the step of filling a region between the first and second analog information indicators with the at least one of information and image(s), such as that shown in FIGS. 6I, 6J.

And lastly, FIGS. 6A, 6E-6N illustrate preferred methodologies that comprises the step of simulating a connection and/or movement and/or growing of the at least one of information and image(s) with the at least one analog information indicator.

To be sure, many of the claimed features and method steps are applicable to more than one embodiment and the specific listings above are exemplary only and not be considered in a limiting sense.

In the preferred embodiments, the motors may be bi-directional stepper motors as appropriate, thus being able to rotate in either direction, and the construction of acceptable stepper motors (or MEMS driving arrangements as the case may be) to functionally operate in this manner are widely available and/or should be well within the understanding of those skilled in the art by reading the documents incorporated herein by reference. However, unidirectional motors are also envisioned herein and could be used instead of or in addition to such bi-directional motors. Suitable dials are also well within the purview of the skilled artisan. One skilled in the art would recognize that varying the number of indicators (e.g. display hands) can vary the number of needed stepper motors, all of which is within the scope of the present invention.

Although the preferred embodiments provide that controller 100 is highly integrated wherein all timing and display functionality is controlled by controller 100, alternate embodiments could separate the timekeeping functions from those processing and other functionality, as would be understood by one skilled in the art.

As should also be appreciated by one skilled in the art, the location, position and/or size of the display indicators and/or display hands are merely dictated, for example, by the position of pinions and the position of the respective sub-assemblies and thus the illustrations herein are shown by example and not limitation.

The gearing ratio to provide for the desirable display rotation or movement of the display hands would be one of design choice depending on the desired or required incremental rotation of the display indicator. Thus the number of wheels in any particular gearing assembly may be more or less than that disclosed herein, and are really one of design choice for the intended function and based upon a number of criterions known to the ordinary designer.

It can thus be seen that the present invention provides for an improved method for and construction of an electronic device that provides for the simulated physical interaction of information and/or image(s) displayable on the digital display with at least one analog information indicator by moving at least one of information and images along, on and/or about the digital display and causing the information and/or image(s) to appear to be blocked by, inhibited by, adhered to, connected to, move on and/or along, the one or more analog indicators.

As alluded to above, the present invention is applicable for the display of a wide range of information and/or images on the digital display 24 and not just the information or image(s) exemplified above.

In addition, since it is envisioned that a wide range of information and/or images is/are applicable for display and simulated physical interaction with the one or more indicators 36, 38, such as checking the weather, obtaining information about sports highlights and/or receiving sports notifications, and/or using the device as a compass, and/or with fitness and/or fitness apps and/or other "well-being" monitoring, playing individual or interactive games such as "pong" or "table tennis," speed/distance, elapsed time, phone messages, incoming call information including the calling party, reminders, among many other informational messages and indicia, it is also contemplated that wearable electronic device 10 may comprises a receiver as indicated generically at 50 (see FIG. 1). Receiver 50 is intended to generically indicate the receiving means to carry out all functionality and structure (e.g. antenna, etc) as needed to receive satellite data, GPS data, phone data, and other sensory data that may be received by device 10.

Also, the use of image, images information and/or image(s), are all intended to be interchangeable as to plural or singular to give the broadest reasonable interpretation to the claims. In this regard, it should be understood that text, words, etc could be used as the images and would thus be interchangeable with "information," etc. So, the present invention contemplates the use of words/text/letters moving across/up/down the digital display and simulate contact with the analog indicators just as all the disclosed examples with images are shown.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall therebetween.

The present invention is also applicable to a wide variety of devices and applications. That is, while the embodiments disclosed herein have been disclosed with reference to quartz analog timepieces and wristwatches in particular, the scope of the invention is not so limiting.

What is claimed is:

1. An electronic device comprising:
   at least one analog information indicator;
   a digital display for displaying at least one of information and image(s);
   a controller, coupled to the at least one analog information indicator and for controlling the positioning of the at least one of information and image(s) on the digital display to simulate interaction between the at least one of information and image(s) displayable on the digital display and the at least one analog information indicator;
   wherein the analog information indicator simulates a barrier, and the controller controls the positioning of the at least one of information and image(s) such that the at least one of information and image(s) displayable on the digital display appear not to be able to pass through the simulated barrier.

2. The electronic device as claimed in claim 1, wherein the controller controls the positioning of the at least one of information and image(s) to create a moving and a stopping of moving of the at least one of information and image(s) to simulate an inability of the at least one of information and image(s) to pass through the at least one analog information indicator.

3. The electronic device as claimed in claim 1, wherein the electronic device is wearable.

4. The electronic device as claimed in claim 3, wherein the electronic device is a timepiece.

5. An electronic device comprising:
   at least one analog information indicator;
   a digital display for displaying at least one of information and image(s);
   a controller, coupled to the at least one analog information indicator and for controlling the positioning of the at least one of information and image(s) on the digital display to simulate interaction between the at least one of information and image(s) displayable on the digital display and the at least one analog information indicator;
   wherein the controller controls the positioning of the at least one of information and image(s) displayable on the digital display to simulate contact with the at least one analog information indicator.

6. The electronic device as claimed in claim 5, wherein the controller controls the positioning of the at least one of information and image(s) to create a moving and a stopping of moving of the at least one of information and image(s) to simulate the contact of the at least information and image(s) with the at least one analog information indicator.

7. An electronic device comprising:
   at least one analog information indicator;
   a digital display for displaying at least one of information and image(s);
   a controller, coupled to the at least one analog information indicator and for controlling the positioning of the at least one of information and image(s) on the digital display to simulate interaction between the at least one of information and image(s) displayable on the digital display and the at least one analog information indicator;
   wherein the controller simulates physical interaction of the at least one of information and image(s) displayable on the digital display with the at least one analog information indicator.

8. An electronic device comprising:
   at least one analog information indicator;
   a digital display for displaying at least one of information and image(s);
   a controller, coupled to the at least one analog information indicator and for controlling the positioning of the at least one of information and image(s) on the digital display to simulate interaction between the at least one of information and image(s) displayable on the digital display and the at least one analog information indicator;
- wherein the at least one analog information indicator simulates a surface to which the at least one of information and image(s) displayable on the digital display can adhere, and wherein the controller controls the positioning of the at least one of information and image(s) such that the at least one of information and image(s) displayable on the digital display appear to adhere to the surface of the at least one analog indicator.

9. An electronic device comprising:
- at least one analog information indicator;
- a digital display for displaying at least one of information and image(s);

a controller, coupled to the at least one analog information indicator and for controlling the positioning of the at least one of information and image(s) on the digital display to simulate interaction between the at least one of information and image(s) displayable on the digital display and the at least one analog information indicator;
- wherein the at least one analog information indicator simulates a surface on which the at least one of information and image(s) displayable on the digital display can move, and wherein the controller controls the positioning of the at least one of information and image(s) such that the at least one of information and image(s) displayable on the digital display appear to move on and/or along the surface of the at least one analog indicator.

10. An electronic device comprising:
- at least one analog information indicator;
- a digital display for displaying at least one of information and image(s);

a controller, coupled to the at least one analog information indicator and for controlling the positioning of the at least one of information and image(s) on the digital display to simulate interaction between the at least one of information and image(s) displayable on the digital display and the at least one analog information indicator;
- wherein the controller controls the positioning of the at least one of information and image(s) such that the at least one of information and image(s) appear connected to the at least one analog information indicator such that movement of the at least one analog information indicator appears to move the at least of information and image(s) with the at least one analog information indicator.

11. A method of displaying at least one of information and an image(s) on a digital display of an electronic device, wherein the electronic device comprises at least one analog information indicator; a digital display for displaying the at least one of information and image(s); and a controller, coupled to the at least one analog information indicator and for controlling the positioning of the at least one of information and image(s) on the digital display to simulate interaction between the at least one of information and image(s) displayable on the digital display and the at least one analog information indicator, wherein the method comprises the steps of:
- displaying the at least one of information and image(s) on the digital display;
- moving the at least one of information and image(s) on the digital display; and
- simulating interaction of the at least one information and image(s) displayed on the digital display with the at least one analog information indicator; and
- simulating a barrier through which the at least one of information and image(s) displayable on the digital display appears not to be able to pass, wherein the barrier is simulated by the at least one analog information indicator.

12. A method of displaying at least one of information and an image(s) on a digital display of an electronic device, wherein the electronic device comprises at least one analog information indicator; a digital display for displaying the at least one of information and image(s); and a controller, coupled to the at least one analog information indicator and for controlling the positioning of the at least one of information and image(s) on the digital display to simulate interaction between the at least one of information and image(s) displayable on the digital display and the at least one analog information indicator, wherein the method comprises the steps of:
- displaying the at least one of information and image(s) on the digital display;
- moving the at least one of information and image(s) on the digital display; and
- simulating interaction of the at least one information and image(s) displayed on the digital display with the at least one analog information indicator; and
- simulating movement of the at least one of information and image(s) across at least a portion of the digital display and simulating a barrier through which the at least one of information and image(s) appears not to be able to pass, wherein the barrier is simulated by the at least one analog information indicator.

13. A method of displaying at least one of information and an image(s) on a digital display of an electronic device, wherein the electronic device comprises at least one analog information indicator; a digital display for displaying the at least one of information and image(s); and a controller, coupled to the at least one analog information indicator and for controlling the positioning of the at least one of information and image(s) on the digital display to simulate interaction between the at least one of information and image(s) displayable on the digital display and the at least one analog information indicator, wherein the method comprises the steps of:
- displaying the at least one of information and image(s) on the digital display;
- moving the at least one of information and image(s) on the digital display; and
- simulating interaction of the at least one information and image(s) displayed on the digital display with the at least one analog information indicator; and
- moving an image in a first direction across at least a portion of the digital display, simulating a bouncing of the image against the at least one analog information indicator, and thereafter, moving the image in a direction different from the first direction.

14. The method as claimed in claim 13, wherein the image is that of a ball.

15. A method of displaying at least one of information and an image(s) on a digital display of an electronic device, wherein the electronic device comprises at least one analog information indicator; a digital display for displaying the at least one of information and image(s); and a controller, coupled to the at least one analog information indicator and for controlling the positioning of the at least one of information and image(s) on the digital display to simulate interaction between the at least one of information and image(s) displayable on the digital display and the at least one analog information indicator, wherein the method comprises the steps of:

displaying the at least one of information and image(s) on the digital display;

moving the at least one of information and image(s) on the digital display; and simulating interaction of the at least one information and image(s) displayed on the digital display with the at least one analog information indicator; and moving a plurality of images across at least a portion of the digital display, and simulating a gathering of the plurality of images against the at least one analog information based on the simulated barrier created by the at least one analog information indicator.

16. The method as claimed in claim 15, wherein the images are those of raindrops.

17. A method of displaying at least one of information and an image(s) on a digital display of an electronic device, wherein the electronic device comprises at least one analog information indicator; a digital display for displaying the at least one of information and image(s); and a controller, coupled to the at least one analog information indicator and for controlling the positioning of the at least one of information and image(s) on the digital display to simulate interaction between the at least one of information and image(s) displayable on the digital display and the at least one analog information indicator, wherein the method comprises the steps of:

displaying the at least one of information and image(s) on the digital display;

moving the at least one of information and image(s) on the digital display; and simulating interaction of the at least one information and image(s) displayed on the digital display with the at least one analog information indicator; and at least one of a moving and a stopping of moving of the at least one of information and image(s) across the digital display to simulate an inability to pass through a simulated barrier created by the at least one analog information indicator.

18. A method of displaying at least one of information and an image(s) on a digital display of an electronic device, wherein the electronic device comprises at least one analog information indicator; a digital display for displaying the at least one of information and image(s); and a controller, coupled to the at least one analog information indicator and for controlling the positioning of the at least one of information and image(s) on the digital display to simulate interaction between the at least one of information and image(s) displayable on the digital display and the at least one analog information indicator, wherein the method comprises the steps of:

displaying the at least one of information and image(s) on the digital display;

moving the at least one of information and image(s) on the digital display; and simulating interaction of the at least one information and image(s) displayed on the digital display with the at least one analog information indicator; and simulating an adhering of the at least one of information and image(s) displayable on the digital display to the at least one analog information indicator.

\* \* \* \* \*